United States Patent

Cho et al.

[11] Patent Number: 6,040,417
[45] Date of Patent: Mar. 21, 2000

[54] PROCESS FOR PREPARING POLYETHYLENE NAPHTHALATE BASED POLYMERS

[76] Inventors: Hyun Nam Cho, 33/9, 2-38, Shingil-Dong, Yongdungpo-ku; Jae Min Hong, 159-4, Anam-Dong 5-Ka, Sungbook-Ku; Young Chan Ko, Hyundai Apt. 53-501, 462, Apkujung-Dong, Kangnam-Ku, all of Seoul; Il Seok Choi, Bagsongmaeul 102-501, 1187, Bagseok-Dong, Ilsan-Ku, Koyang Kyungki-Do; Young Jin Heo, Hyundai Apt. 102-1701, 234, Hwayang-Dong, Kwangjin-Ku, Seoul, all of Rep. of Korea

[21] Appl. No.: 09/396,490

[22] Filed: Sep. 14, 1999

[30] Foreign Application Priority Data

Feb. 24, 1999 [KR] Rep. of Korea .......................... 99-6107

[51] Int. Cl.⁷ .............................. C08G 63/78; C08G 63/02
[52] U.S. Cl. ........................... 528/279; 528/185; 528/277; 528/281; 528/283; 528/285; 528/286; 528/298; 528/302; 528/308; 528/308.6
[58] Field of Search ..................................... 528/277, 185, 528/279, 281, 283, 285, 286, 298, 302, 308, 308.6

[56] References Cited

U.S. PATENT DOCUMENTS 5,286,836  2/1994  Park et al. ............................... 528/275
5,714,570  2/1998  Kim et al. ............................... 528/279

FOREIGN PATENT DOCUMENTS

| 49-31317 | 3/1974 | Japan . |
| 53-51295 | 5/1978 | Japan . |
| 58-117216 | 7/1983 | Japan . |
| 60-166320 | 8/1985 | Japan . |
| 62-265324 | 11/1987 | Japan . |
| WO 90/14375 | 11/1990 | WIPO . |
| WO 97/17391 | 5/1997 | WIPO . |

*Primary Examiner*—Samuel A. Acquah
*Attorney, Agent, or Firm*—Darby & Darby

[57] ABSTRACT

A process for preparing polyethylene naphthalate polymer by using a composite catalyst. The process comprises the steps of esterifying a dicarboxylic acid containing 2,6-NDCA, a dicarboxylic ester containing 2,6-NDC or derivatives thereof, with ethylene glycol or a glycol containing ethylene glycol to produce esterification polymers containing bis(beta-hydroxyethyl)naphthalate; continuously polycondensing the obtained esterification polymers to prepare a polymers of polyethylene naphthalate; and wherein the process includes using a composite polymerization catalyst, said composite polymerization catalyst comprising a titanium compound, a phosphorous compound and optionally an antimony compound. The process can considerably reduce both the esterification time and the polycondensation time and provides a good color and excellent physical characteristics.

16 Claims, No Drawings

PROCESS FOR PREPARING POLYETHYLENE NAPHTHALATE BASED POLYMERS

BACKGROUND OF THE INVENTION

The present invention relates to a process for preparing polyethylene naphthalate (hereafter as "PEN") based polymers. More particularly, the present invention relates to a novel and advanced process for preparing PEN based polymers by using a composite polymerization catalyst comprising a titanium compound, a lead compound and an antimony compound.

Of polymeric polyesters, PENs have superior properties compared to polyethylene terephthalate (hereinafter as "PET"), the PENs are most widely known and commercially important because of their higher degree of crystallization, higher softening point, and other various superior properties in terms of strength, chemical resistance, thermal resistance, weather resistance, electric insulation, etc. Such PENs are widely used for manufacturing high quality films, bottles and high strength fiber and other industrial materials.

There are two steps in preparing PEN in the industrial preparation method. The first step is performed by means of either a direct esterification or an ester-interchange reaction. In the ester-interchange reaction, 2,6-naphthalene dicarboxylic acid dimethylester (2,6-NDC) and ethylene glycol (EG) are reacted in the presence of catalysts such as zinc acetate [$Zn(OAc)_2$] or manganese acetate [$Mn(OAc)_2$] at reaction temperatures ranging from 180 to 260° C. to remove methanol. In the direct esterification reaction, 2,6-naphthalene dicarboxylic acid (2,6-NDCA) and ethylene glycol (EG) are heated to reaction temperatures ranging from 200 to 280° C. under atmosphere or pressure to remove water. The product of the first step is bis(beta-hydroxyethyl) naphthalate and/or its low prepolymer (hereinafter as "esterified compounds") and thereafter in the second step, the synthesized, esterified compounds are polycondensed in the presence of polymerization catalysts such as antimony trioxide ($Sb_2O_3$) at a higher reaction temperatures ranging from 280 to 300° C. under reduced pressure (generally less than 1.0 torr) in order to prepare the high polymers.

Until recently, ester-interchange reaction has been mainly adopted for industrial preparation of PEN because of the high price of the starting materials of the direct esterification method. However, direct esterification is expected to be adopted widely when 2,6-NDCA is industrially mass-produced at an economical price.

Similar to the PET preparation, reaction catalysts are generally used to accelerate and smoothly advance a reaction in preparing PEN. These catalysts include a variety of metal compounds such as antimony, titanium, germanium, tin, zinc, manganese, lead and the like. It is well-known to those skilled in the art that the color and thermal stability of the resulting PEN and the reaction rate are considerably varied depending on the catalysts used. The reactions for preparing PENs are carried out at high temperatures for an extensive period in the presence of catalysts containing metals.

Accordingly, the reactions for preparing PENs of a high degree of polymerization in a short time are accompanied by several undesirable side reactions that result in coloring the polymer product yellow and increasing the amount of diethylene glycol and the concentration of terminal carboxylic groups above their optimum levels. Consequently, the physical properties of the prepared PENs, for example, the melting point, strength and the like are deteriorated. Therefore, it is important to prepare polymers that can exhibit good color and superior physical properties even at a high reaction rate.

At the present time, antimony compounds, especially antimony trioxide, is mainly used as an industrial polycondensation catalyst, since it is inexpensive and exhibits good catalytic activity and good thermal stability. However, antimony trioxide is basically not soluble in ethylene glycol or other reaction mixtures and tends to precipitate during the reaction, thereby causing the resulting color of the PEN is gray or yellow-green or the transparency thereof is decreased. These are more distinct if the amount of the catalyst used and the reaction temperature are increased to improve the productivity.

In order to provide catalysts for solving the above-mentioned problems, there have been several methods proposed to reduce the esterification reaction time and the polycondensation reaction time and to produce polyesters exhibiting good color and superior physical properties. However, many of the methods could not solve the above-mentioned problems: a method of dissolving antimony trioxide, a compound of cobalt and a compound of phosphorous in ethylene glycol (Japanese Laid-Open Patent No. Sho 53-51295) and a method in which compound of antimony is used with an organic acid (Japanese Laid-Open Patent No. Sho 60-166320) were tried. However, these methods cannot substantially reduce both the esterification reaction time and the polycondensation reaction time. They also generate several problems in physical properties of the prepared polyesters, in that the color of the prepared polymer is light yellow or the content of the diethylene glycol or terminal carboxylic groups are increased. Also, as a method for improving the color and physical properties of the prepared polymer, there have been known, for example, a method in which compounds of cobalt and alkali metal are used with a compound of antimony (Japanese Laid-Open Patent No. Sho 58-117216), a method in which a compound of antimony is used with a compound of tin (Japanese Laid-Open Patent No. Sho 49-31317), and a method in which antimony, tin, cobalt and alkali are used with a compound of phosphorous (Japanese Laid-Open Patent No. Sho 62-265324). However, these methods can not improve the color, transparency and physical properties of the prepared polymer at the same time and can not provide any important advantage in terms of the reduction of the reaction time. On the other hand, according to the previous inventions by the present inventors, these problems of preparing polyesters, especially PET have been overcome.

In these inventions, PETs are prepared by using a compound of titanium and a compound of antimony (U.S. Pat. No. 5,286,836) and by using additional tin compound along with a compound of titanium and a compound of antimony to form a composite catalyst system (U.S. Pat. No. 5,714,570). However, a marked difference between the preparation of PEN and PET exists. For instance, the reactant, 2,6-NDCA has a lower solubility in EG, higher molecular weight and smaller crystal sizes than TPA(terephthalic acid). Therefore, it is not possible to feed the poorly made slurry into the reactor if 2,6-NDCA and EG is used in similar molar ratio of PET preparation (generally, EG/TPA=1.1~2.5). Moreover, more care is needed in preparing PEN since the naphthalene ring of 2,6-NDCA or 2,6-NDC is more prompt to colorize by impurities than the benzene ring of PET, and PEN has a higher melt viscosity when melted and has a higher polymerization temperature than PET. Other methods to overcome these problems have been introduced (WO 90-14375 and WO 97-17391), however, without much success in shortening the reaction time or in improving the productivity.

DISCLOSURE OF THE INVENTION

It is an object of the present invention to provide a process for preparing polyethylene naphthalate based polymers while reducing both the esterification time and the polycondensation time and providing a good color and excellent physical characteristics to prepare high quality polyester, especially PEN with high productivity.

DETAILED DESCRIPTION OF THE INVENTION

The present invention provides a process for preparing polyethylene naphthalate polymers, comprising the steps of:

(a) esterifying a dicarboxylic acid containing 2,6-NDCA, dicarboxylic ester containing 2,6-NDC or derivatives thereof and ethylene glycol or glycol containing ethylene glycol to produce esterification polymers containing bis(beta-hydroxyethyl) naphthalate;

(b) polycondensing continuously the resultant esterification polymers to produce polymers of polyethylene naphthalate; and, wherein the above process includes using a composite polymerization catalyst comprising at least one compound of titanium and at least one compound of aromatic phosphite, and the titanium compound is a compound represented by formulas I or II:

(RO)$_4$Ti,                            Formula I

(RO)$_4$Ti.2XP(O)(OR')$_2$,          Formula II wherein R and R' are the same or different, and is selected from the group consisting of a methyl group, an ethyl group, an n-propyl group, an isopropyl group, an n-butyl group, an isobutyl group, a sec-butyl group, a tert-butyl group, an n-amyl group, an acetylisopropyl group, a pentyl group, a hexyl group, a heptyl group, a 2-ethylhexyl group, an octyl group, a decyl group, a dodecyl group, a tridecyl group, an octadecyl group, a stearyl group, an allyl group, a 2,2-diallyloxymethylbutyl group, a cyclopentyl group, a cyclohexyl group, a naphthyl group, a phenyl group, a benzyl group, and a dodecylbenzyl group, and X represents a hydrogen group, a halogen group, an alkyl group, an alkoxy group or an aryloxy group.

In the process for preparing a PEN compound according to the present invention, the composite polymerization catalyst could further comprise a tin compound or a cobalt compound in the ethylene glycol or a solvent containing ethylene glycol, and further at least one compound of antimony.

Also, it would provide a better result if the glycol solution containing dissolved composite catalyst of the present invention is used after heating it at a temperatures ranging from 20 to 200° C., preferably from 50 to 150° C.

The titanium compound used in the composite catalyst of the present invention can be selected from any compound represented by formulas I or II. However, better results can be obtained when R' in Formula II is an aromatic group such as a phenyl group and a naphthyl group. In other words, it is preferable to select a titanium compound forming a complex with an aromatic phosphite such as diphenylphosphite, triphenylphosphite and phenyinaphthylphosphite.

Titanium compounds can be selected preferably from the group consisting of tetraisopropyl titanate, tetrabutyl titanate, tetraisopropyldi(dioctyl)phosphito titanate and tetraoctyldi(ditridecyl)phosphito titanate.

Also can be used are titanium halides selected from the group consisting of titanium ethylene glycoxide, titanium tetrachloride; titanium esters selected from the group consisting of potassium titanium oxyoxalate; monoalkoxy titanates selected from the group consisting of isopropyl triisostearoyl titanate and isopropyl tri (N-ethylenediamino) ethyl titanate; titanate chelates selected from the group consisting of dicumylphenyl oxoethylene titanate and di(dioctyl) phosphato ethylene titanate; neoalkoxytitanates selected from the group consisting of neopentyl(diallyl)oxytri(N-ethylenediamino) ethyltitanate and neopentyl(diallyl)oxytri (dodecyl)benzenesulfonyltitanate; and heterocyclic titanates selected from the group consisting of cyclo(dioctyl) pyrophosphato-dioctyl titanate and dicyclo (dioctyl) pyrophosphatotitanate.

The aromatic phosphite compounds in the present invention are diphenyl phosphites or triphenylphosphites, preferably those having a chemical characteristic of Formula III.

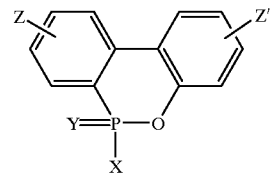

Formula III wherein X represents a hydrogen group, a halogen group, an alkyl group, an alkoxy group or an aryloxy group, and Y represents oxygen or sulfur. Z and Z' are the same or different, and is independently selected from the group consisting of a halogen group, an alkyl group, an alkoxy group, an aryloxy group, an acyl group, a nitro group, a cyano group or a sulfonic acid group.

The aromatic phosphite compound having the chemical characteristics of Formula III is preferably selected form the group consisting 9,10-dihydro-9-oxa-10-phosphaphenanthrene-10-oxide, 9,10-dihydro-9-oxa-10-phosphaphenanthrene-10-sulfoxide, 9,10-dihydro-9-oxa-10-phenoxyphosphaphenanthrene-10-oxide, 9,10-dihydro-9-oxa-10-ethoxyphosphaphenanthrene-10-oxide, 9,10-dihydro-9-oxa-10-phenoxyphospha-phenanthrene-10-sulfoxide, 9,10-dihydro-9-oxa-10-phenylphosphaphenanthrene-10-oxide, 9,10-dihydro-9-oxa-10-methylphosphaphenanthrene-10-oxide, 6-nitro-9,10-dihydro-9-oxa-10-phenoxyphosphaphenanthrene-10-oxide, and 6-bromo-9,10-dihydro-9-oxa-10-methylphosphaphenanthrene-10-oxide.

Among these phosphite compounds, 9,10-dihydro-9-oxa-10-phosphaphenanthrene-10-oxide, 9,10-dihydro-9-oxa-10-phenoxyphosphaphenanthrene-10-oxide, diphenyl phosphite and triphenylphosphite are preferred.

Antimony compounds of the present invention can be selected from the group consisting of antimony oxides such as antimony trioxide, antimony tetraoxide or antimony pentoxide; antimony halides such as antimony trichloride or antimony trifluoride; antimony carboxylates such as antimony triacetate [Sb(OAc)$_3$], antimony tristearate, antimony tribenzoate, antimony tri-2-ethylhexanoate, or antimony trioctoate; antimony compounds combined with ether such as antimony triethoxide, antimony ethylene glycoxide, antimony tri-iso-propoxide, antimony tri-n-butoxide, or antimony triphenoxide; antimony hydroxide; and antimony sulfide, and preferably antimony trioxide and antimony triacetate.

Alternatively, tin compound represented by Formula IV can be used in said composite catalyst:

$$R_2SnX' \qquad \text{Formula IV}$$

wherein $R_2$ is identical to the R of the above-mentioned titanium compounds of formula I and II, and X' represents oxygen, sulfur, halides or the compounds containing ether, thio or ester bonds. For example, tin compounds of the present application include dibutyltin oxide, diphenyltin sulfide, dimethyltin chloride, dibutyltin sulfate, diotyltin mercaptide, dibutyltin bis(dibutyidithiocarbamate), dibutyltin dilaurate, dibutyltin salicylate, dibutyltin maleate, dioctyltin bis(isooctylmercaptoacetate), dioctyltin maleate and dibutyltin mercaptoacetate.

In the case a cobalt compound is used in the composite catalyst of the present invention, it is preferable to use cobalt acetate.

The titanium compound, phospite compounds and antimony compounds that can be used in the composite catalyst of the present invention can be used alone or in combination of two or more compounds to obtain better results.

It is not necessary to limit the amount of the catalyst used in the present invention. However, it is desirable to have enough quantity to obtain desirable reaction rates depending on the reaction condition. The quantity of the composite catalyst is 20 to 2000 ppm, preferably 50 to 500 ppm to the resulting PEN polymer. Also, catalyst could be added to the reaction mixture during or after the esterification reaction, in other words, before the polycondensation reaction. However, it is desirable to add the composite catalyst before the esterification reaction to improve the productivity and to shorten the reaction time. In the case esterification is performed by using 2,6-NDCA or 2,6-NDC and ethylene glycol, it is preferable to use the composite catalyst of the present invention. As another preparation process, the composite catalyst can be added both before esterification and before initiation of the polycondensation reaction. When performing the direct esterification reaction in the present invention, it is desirable to perform the reaction at 200–280° C. at any pressure condition such as atmospheric or pressure condition. In the case of the ester interchange reaction, it is desirable to use the composite catalyst of the present invention instead of conventional catalyst at 180–260° C. The esterification prepolymer obtained by the esterification reaction can be polycondensed at 280–300° C., preferably having a final temperature of 285–295° C. It is desirable to elevate the reaction temperature and to increase slowly the degree of vacuum simultaneously slowly during the polycondensation reaction. It is desirable to have lower than 1 torr of vacuum as a final pressure.

Also it is possible to use other reaction catalysts together with the composite catalyst of the present invention. Germanium compound such as germanium oxide, crboxylates compounds of zinc, manganese, lead such as zinc acetate, manganese acetate and lead acetate, and compound of an alkali metal such as sodium, potassium hydroxide, and potassium acetate can be used.

The present invention can be effectively applied in producing PEN polymers by esterifying a dicarboxylic acid containing 2,6-NDCA, a dicarboxylic ester containing 2,6-NDC or derivatives thereof and ethylene glycol or a glycol containing ethylene glycol. Additionally, the present invention can be applied in producing a PEN polymers with at least one of third component. In this case preferably major acid and its ester are 2,6-NDCA and 2,6-NDC, respectively, major glycol is ethylene glycol and the third component would not exceed 40% of the total. For example, the third component could be selected from the group consisting of phthalic acid or derivatives thereof such as terephthalic acid, phthalic acid or isophthalic acid, aromatic, aliphatic and cyclic dicarboxylic acid such as diphenylsulfondicarboxylic acid, diphenylmethanedicarboxylic acid, diphenyletherdicarboxylic acid, diphenoxyethanedicarboxylic acid, malonic acid, succinic acid, glutalic acid, adipic acid, azelaic acid, sebasic acid, cyclohexanedicarboxylic acid and decalindicarboxylic acid, or the derivative thereof such as methyl ester, ethyl ester and phenyl ester compounds, i.e., dimethylcarbonate and diphenylcarbonate.

The glycols include aliphatic, cyclic and aromatic diols such as 1,3-propanediol, 1,2-propanediol, 1,2-butanediol, 1,3-butanediol, 1,4-butanediol, 1,5-pentanediol, 1,6-haxanediol, 1,4-cyclohexane dimethanol, 2,6-decahydronaphthalene dimethanol, 1,4-cylcoanediol, bisphenol A, bisphenol S, bishydroxyethoxy bisphenol A, and tetrabromobisphenol A.

Also polyfunctional cross-linking agent selected from the group consisting of trimellitic acid, trimesic acid, pyromellitic acid, trimethylolpropane, glycerin, and pentaerythritol; monofunctional terminating agent selected from the group consisting of monomethoxypolyethylene glycol, stearyl alcohol, palmitic acid, benzoic acid, and naphthoic acid can be added.

Moreover, a phosphorus compound can be added as a thermal stabilizer. Or the above mentioned aromatic phosphite compound can be used as a thermal stabilizer. The phosphorous compound that can be used as a thermal stabilizer are phosphoric acid, phosphorous acid, metaphosphoric acid, trimethylphosphate, triethylphosphate, triphenylphosphate, trioctylphosphate, dimethylphosphite, diethylphosphite, dicyclohexylphosphite, diphenylphosphite, dioctylphosphite, dimethylpyrophosphate, and dioctylpyrophosphate. A hindered phenol such as Irganox 1010, Irganox 1076, and Irganox 1098 (Ciba-Geigy Company, Germany) can be added as an antioxidant.

In additional, other additives can be used; ultraviolet absorbent such as benzotriazol; an anti-softening point dropping agent such as triethylamine; a delustering agent such as titanium oxide; a nuclear agent such as silica and alumina; and other compounds such as a dye, a fluorescent whitening agent, an antistatic agent, and a flame retardant.

The invention will be further illustrated by the following examples. It should be understood that these examples are intended to be illustrative only and the present invention is not limited to the conditions, materials or devices recited therein.

In the following examples, all parts are given by weight unless otherwise stated. Also, the intrinsic viscosity ($\eta$) of the polymers is evaluated at 30° C., by using a solution of 6 parts of phenol admixed with 4 parts of tetrachloroethane. The color of the polymers is measured at the chip state polymers by color diffractometer, and the L values and b values describe the lightness and the degree of yellow colorization of the polyesters, respectively. A higher L value and a lower b value indicate improved color.

EXAMPLE 1

After heating a composite catalyst solution, in which 50 ppm of tetraisopropyltitanate, 100 ppm of 9,10-dihydro-9-oxa-10-phosphaphenanthrene-10-oxide and 100 ppm of antimony trioxide to an amount of the resulting PEN products were dissolved in ethylene glycol at 50° C. for 24 hours, the heated catalyst solution was added to a mixture of ethylene glycol and 2,6-NDCA as a reaction catalyst. At this time, the entire amount of ethylene glycol and 2,6-NDCA used were 124 parts and 216 parts, respectively, so that the molar ratio was controlled to be 2.0. And then, the EG/2,6-NDCA mixture was fed into an esterification reactor in which 300 parts of the esterification polymers were already present. Subsequently, the mixture was subjected to direct esterification at high pressure for 4 hours and 40 minutes at 240° C. to give esterification polymers.

Thereafter, the resulting esterification polymers were fed into a polycondensation reactor equipped with an agitator and a torquemeter. The temperature and degree of vacuum were slowly increased to a final temperature and pressure of 295° C. and 0.8 torr, respectively, in carrying out polycondensation. The polycondensation reaction was terminated after 1 hour and 15 minutes. The polycondensation polymers were extruded from the lower nozzle of the reactor into cooling water in order to form chip state polymers.

The characteristics of the resulting polymers are given in Table 1.

COMPARATIVE EXAMPLE 1

An esterification was carried out in a manner similar to that in Example 1, except that the reaction catalysts were not added into the EG/2,6-NDCA mixture and esterification polymers. The esterification was continued for 7 hours and 40 minutes. Then, the esterification polymers were polycondensed for 2 hours and 30 minutes by adding 250 ppm of antimony trioxide and 100 ppm of trimethylphosphate to the amount of the resulting PEN products in the same polycondensation condition as described in Example 1.

The characteristics of the resulting polymers are given in Table 1.

COMPARATIVE EXAMPLE 2

An esterification was carried out in a manner similar to that in Example 1, except that 250 ppm of tetraisopropyltitanate was added as a reaction catalyst into the EG/2,6-NDCA mixture. The esterification was continued for 4 hours and 20 minutes.

Then, the esterification polymers were polycondensed in the same polycondensation condition as described in Example 1. The polycondensation was terminated after 1 hour and 23 minutes.

The characteristics of the resulting polymers are given in Table 1.

EXAMPLE 2

An esterification was carried out in a manner similar to that in Example 1, except that 50 ppm of tetraisopropyl di(dioctyl)phosphito titanate instead of 50 ppm of tetraisopropyltitanate, 100 ppm of 9,10-dihydro-9-oxa-10-phosphaphenanthrene-10-oxide and 100 ppm of antimony trioxide were used as a reaction catalyst in an EG/2,6-NDCA mixture. The esterification was continued for 4 hours and 50 minutes.

Then, the esterification polymers were polycondensed in the same polycondensation condition as described in Example 1. The polycondensation was terminated in 1 hour and 20 minutes.

The characteristics of the resulting polymers are given in Table 1.

EXAMPLE 3

Under the same esterification and polycondensation conditions as in Example 1, a composite catalyst containing 50 ppm of antimony trioxide, 150 ppm of tetraoctyl di(ditridecyl)phosphito titanate and 200 ppm of 9,10-dihydro-9-oxa-10-phenoxyphosphaphenanthrene-10-oxide was heated in ethylene glycol for 12 hours at 120° C. and added to the reaction mixtures. Esterification reaction was carried out in a manner similar to that in Example 1. The esterification was continued for 4 hours and 20 minutes. Then, the esterification polymers were fed into the polycondensation reactor and were polycondensed in the same polycondensation condition as described in Example 1. The polycondensation was terminated in 1 hour and 25 minutes.

The characteristics of the resulting polymers are given in Table 1.

EXAMPLE 4

Under the same esterification and polycondensation conditions as in Example 1, a composite catalyst containing 100 ppm of antimony trioxide, 100 ppm of tetrabutyltitanate, 100 ppm of 9,10-dihydro-9-oxa-10-phenoxyphosphaphenanthrene-10-oxide and 15 ppm of dibutyltin meleate was used. Esterification reaction was carried out in a manner similar to that in Example 1. The esterification was continued for 4 hours and 52 minutes. Then, the esterification polymers were fed into the polycondensation reactor and were polycondensed in the same polycondensation condition as described in Example 1. The polycondensation was terminated in 1 hour and 10 minutes.

The characteristics of the resulting polymers are given in Table 1.

EXAMPLE 5

Under the same esterification and polycondensation conditions as in Example 1, a composite catalyst containing 100 ppm of tetraisopropyl titanate and 100 ppm of diphenylphosphite was heated in ethylene glycol for 6 hours at 70° C. and added to the reaction mixtures. Esterification reaction was carried out in a manner similar to that in Example 1. The esterification was continued for 4 hours and 30 minutes. Then, the esterification polymers were fed into the polycondensation reactor and were polycondensed in the same polycondensation condition as described in Example 1. The polycondensation was terminated in 1 hour and 15 minutes.

The characteristics of the resulting polymers are given in Table 1.

EXAMPLE 6

Under the same esterification and polycondensation conditions as in Example 1, a composite catalyst containing 85 ppm of tetraisopropyl titanate and 150 ppm of triphenylphosphite and 15 ppm of dibutyltin meleate was heated in ethylene glycol for 12 hours at 60° C. and added to the reaction mixtures. Esterification reaction was carried out in a manner similar to that in Example 1. The esterification was continued for 4 hours and 15 minutes. Then, the esterification polymers were fed into the polycondensation reactor and were polycondensed in the same polycondensation condition as described in Example 1. The polycondensation was terminated in 1 hour and 10 minutes.

The characteristics of the resulting polymers are given as shown in Table 1.

EXAMPLE 7

After heating the composite catalyst solution, in which 70 ppm of tetraisopropyidi(dioctyl)phosphito titanate, 120 ppm of 9,10-dihydro-9-oxa-10-phosphaphenanthrene-10-oxide and 50 ppm of antimony trioxide to the amount of the resulting PEN products were dissolved in ethylene glycol at 90° C. for 12 hours, the heated catalyst solution was added to a slurry of ethylene glycol and 2,6-NDC as a reaction catalyst. At this time, the entire amounts of ethylene glycol and 2,6-NDC used were 224 parts and 490 parts, respectively, so that the molar ratio was controlled to be 1.8. And then, the EG/2,6-NDC slurry being added with the reaction catalysts, was fed into an esterification reactor. Subsequently, the mixture was subjected to direct esterification at a high pressure for 2 hours and 10 minutes at 220° C. to obtain esterification polymers. Thereafter, the resulting esterification polymers were fed into a polycondensation reactor equipped with an agitator and a torquemeter. The temperature and degree of vacuum were slowly increased to a final temperature and pressure of 295° C. and 0.8 torr, respectively, to carry out the polycondensation. The polycondensation reaction was terminated after 1 hour and 5 minutes. The polycondensation polymers were extruded from the lower nozzle of the reactor into cooling water in order to form chip state polymers.

The characteristics of the resulting polymers are given in Table 1.

COMPARATIVE EXAMPLE 3

Esterification reaction was carried out in a manner similar to that in Example 7, except that 200 ppm of manganese acetate was added as a reaction catalyst into the EG/2,6-NDC mixture. The esterification was continued for 2 hours and 50 minutes.

Then, the esterification polymers were polycondensed for 2 hours and 20 minutes by adding 250 ppm of antimony trioxide and 100 ppm of trimethylphosphate to the resulting PEN products in the same polycondensation condition as described in Example 7.

The characteristics of the resulting polymers are given in Table 1.

EXAMPLE 8

Under the same esterification and polycondensation conditions as in Example 7, a composite catalyst containing 100 ppm of tetraisopropyltitanate and 150 ppm of diphenylphosphite in ethylene glycol was heated at 50° C. for 24 hours and added to the reactor. Esterification reaction was carried out in a manner similar to that in Example 7. The esterification was continued for 2 hours and 10 minutes. Then, the esterification polymers were fed into the polycondensation reactor and were polycondensed in the same polycondensation condition as those in Example 7. The polycondensation was terminated in 1 hour and 15 minutes.

The characteristics of the resulting polymers are given in Table 1.

TABLE 1

| Examples | Intrinsic viscosity (dl/g) | DEG content (wt %) | COOH concentration | L value | B value |
|---|---|---|---|---|---|
| Example 1 | 0.642 | 0.82 | 28.4 | 78.8 | 4.5 |
| C. Example 1 | 0.345 | — | — | — | — |
| C. Example 2 | 0.643 | 1.35 | 39.1 | 80.0 | 7.9 |
| Example 2 | 0.638 | 0.85 | 27.8 | 79.1 | 4.9 |
| Example 3 | 0.644 | 0.89 | 29.1 | 78.8 | 5.3 |

TABLE 1-continued

| Examples | Intrinsic viscosity (dl/g) | DEG content (wt %) | COOH concentration | L value | B value |
|---|---|---|---|---|---|
| Example 4 | 0.640 | 0.85 | 27.2 | 79.2 | 4.3 |
| Example 5 | 0.641 | 0.78 | 29.5 | 77.3 | 5.1 |
| Example 6 | 0.639 | 0.88 | 28.5 | 78.5 | 4.6 |
| Example 7 | 0.646 | 0.93 | — | 80.3 | 5.8 |
| C. Example 3 | 0.645 | 1.05 | — | 76.4 | 4.2 |
| Example 8 | 0.647 | 0.91 | — | 81.1 | 6.2 |

EXAMPLE 9

Under the same esterification and polycondensation conditions as in Example 1, an esterification reaction was carried out for 3 hours by using 118 parts of diphenyl carbonate, 114 parts of tetraisopropyl di(dioctyl)phosphito titanate and 100 ppm of cobalt acetate, and the esterification polymer having 11000 of a molecular weight are produced. 20 parts of produced esterification polymer was combined with 180 parts of esterification polymer prepared in Example 1 and polycondensed for 2 hours and 10 minutes in the same condition as in Example 1. 20 parts of the esterification polymer were combined with 180 parts of an esterification polymer prepared in Example 1 and polycondensed for 2 hours and 10 minutes in the same conditions in Example 1. The Intrinsic viscosity of the resulting copolymers was 0.53.

As seen above, it is possible to prepare PEN based polymers of superior quantities such as good color and excellent physical properties according to the present invention. Moreover, it is expected to have high industrial applicability since the esterification time and polycondensation time could be greatly reduced.

Although the present embodiment of the present invention have been disclosed for illustrative purpose, those skilled in the art will appreciate that various modification, additions and substitutions are possible, without departing from the scope and spirit of the invention as recited in the accompanying claims.

What is claimed is:

1. A process for preparing polyethylene naphthalate polymers comprising the steps of:

(a) esterifying a dicarboxylic acid containing 2,6-NDCA, dicarboxylic ester containing 2,6-NDC or derivatives thereof and ethylene glycol or glycol containing ethylene glycol to produce esterification polymers containing bis(beta-hydroxyethyl)naphthalate;

(b) polycondensing continuously the resultant esterification polymers of step (a) to produce polymers of polyethylene naphthalate; and, wherein the above process includes using a composite polymerization catalyst comprising at least one compound of titanium and at least one compound of aromatic phosphite, and the titanium compound represented by formulas I or II:

(RO)$_4$Ti,  Formula I (RO)$_4$Ti.2XP(O)(OR')$_2$  Formula II

R and R' are the same or different and are selected from the group consisting of a methyl group, an ethyl group, an n-propyl group, an isopropyl group, an n-butyl group, an isobutyl group, a sec-butyl group, a tert-butyl group, an n-amyl group, an acetylisopropyl group, a pentyl group, a hexyl group, a heptyl group, a 2-ethylhexyl group, an octyl group, a decyl group, a dodecyl group, a tridecyl group, an octadecyl group, a stearyl group, an allyl group, a 2,2-diallyloxymethylbutyl group, a cyclopentyl group, a cyclohexyl group, a naphthyl group, a phenyl group, a benzyl group, and a dodecylbenzyl group, and X represents a hydrogen group, a halogen group, an alkyl group, an alkoxy group or an aryloxy group.

2. The process of preparing polyethylene naphthalate polymers according to claim 1, wherein said aromatic phosphite compound has a chemical characteristic of Formula III:

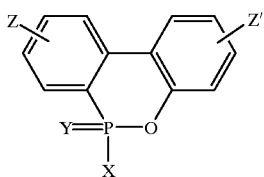

Formula III

X represents a hydrogen group, a halogen group, an alkyl group, an alkoxy group or an aryloxy group, and Y represents oxygen or sulfur, Z and Z' are the same or different, and is independently selected from the group consisting of a halogen group, an alkyl group, an alkoxy group, an aryloxy group, an acyl group, a nitro group, a cyano group and a sulfonic acid group.

3. The process of preparing polyethylene naphthalate polymers according to claim 1, wherein said aromatic phosphite compound is selected from the group consisting of 9,10-dihydro-9-oxa-10-phosphaphenanthrene-10-oxide, 9,10-dihydro-9-oxa-10-phenoxyphosphaphenanthrene-10-oxide, diphenylphosphite and triphenylphosphite.

4. The process of preparing polyethylene naphthalate polymers according to claim 1, wherein said composite polymerization catalyst further comprises at least one compound of antimony.

5. The process of preparing polyethylene naphthalate polymers according to claim 4, wherein said antimony compound is selected from the group consisting of antimony trioxide and antimony triacetate.

6. The process of preparing polyethylene naphthalate polymers according to claim 1, wherein the amount of said composite polymerization catalyst is 50 to 2,000 ppm to the resulting polymers of polyethylene naphthalate.

7. The process of preparing polyethylene naphthalate polymers according to claim 1, wherein a solution of said glycol which the composite polymerization catalyst is dissolved is heated at a temperature ranging from 20 to 200° C. before the reaction.

8. The process of preparing polyethylene naphthalate polymers according to claim 7, wherein a solution of said glycol which said composite polymerization catalyst is dissolved is heated at a temperature ranging from 50 to 150° C. before the reaction.

9. The process of preparing polyethylene naphthalate polymers according to claim 1, wherein said titanium compound is selected from the group consisting of tetraisopropyl titanate, tetrabutyl titanate, tetraisopropyldi(dioctyl)phosphito titanate and tetraoctyldi(ditridecyl)phosphito titanate.

10. The process of preparing polyethylene naphthalate polymers according to claim 1, wherein the composite polymerization catalyst is added before, after or during said esterification step (a) or added just before said polycondensing step (b).

11. The process of preparing polyethylene naphthalate polymers according to claim 10, wherein the composite polymerization catalyst is added before said esterification step (a).

12. The process of preparing polyethylene naphthalate polymers according to claim 1, wherein said composite polymerization catalyst further comprises at least one selected from the group consisting of a tin compound, a germanium compound, a zinc compound and a manganese compound.

13. The process of preparing polyethylene naphthalate polymers according to claim 12, wherein said composite polymerization catalyst further comprises at least one selected from the group consisting of dibutyltin maleate, germanium oxide, zinc acetate and manganese acetate.

14. The process of preparing polyethylene naphthalate polymers according to claim 1, wherein in step (a) a further comprises at least one of a carboxylic acid or derivatives thereof, or a glycol or derivatives thereof.

15. The process of preparing polyethylene naphthalate polymers according to claim 14, wherein said carboxylic acid or derivatives thereof is selected from the group consisting of terephthalic acid, dimethylterephthalate and diphenyl carbonate.

16. The process of preparing polyethylene naphthalate polymers according to claim 14, wherein a glycol or derivatives thereof is a bisphenol A.

* * * * *